Aug. 1, 1950     J. M. KNEECE     2,517,495
FISHING LURE
Filed Sept. 2, 1947
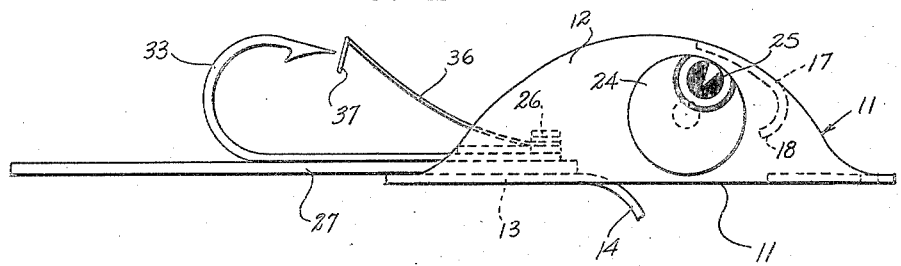
FIG. 1.
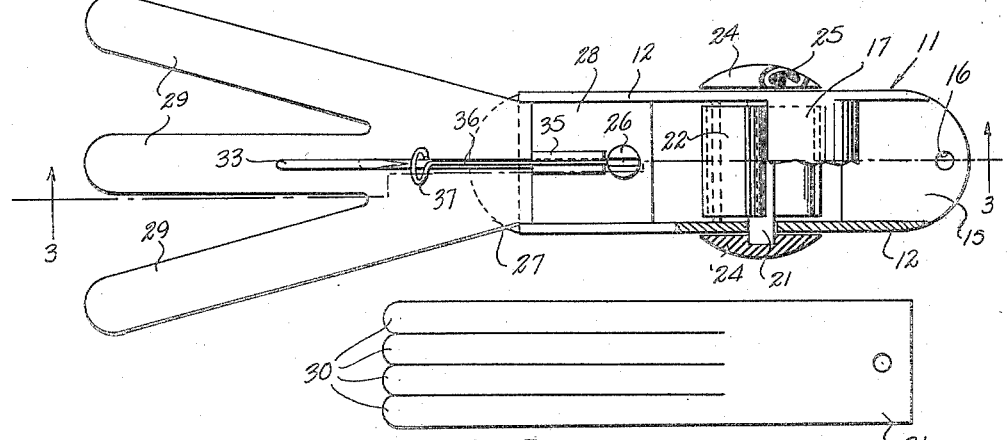
FIG. 2.
FIG. 5.
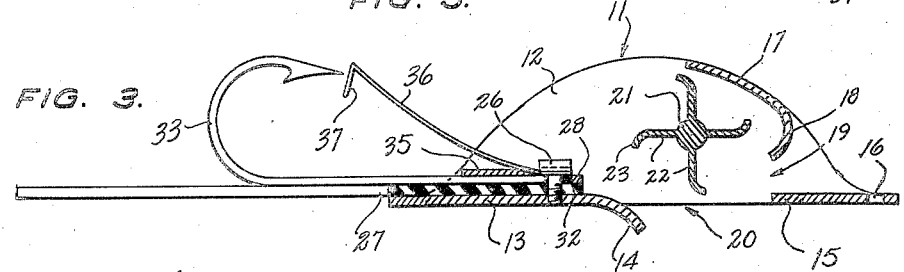
FIG. 3.
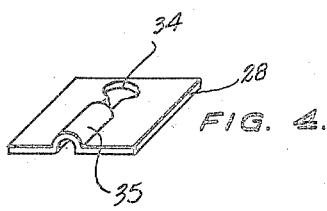
FIG. 4.
FIG. 6.
INVENTOR.
JACK M. KNEECE,
BY
McMorrow, Berman & Davidson
ATTORNEYS.

Patented Aug. 1, 1950

2,517,495

UNITED STATES PATENT OFFICE 2,517,495

FISHING LURE

Jack M. Kneece, New Orleans, La.

Application September 2, 1947, Serial No. 771,716

8 Claims. (Cl. 43—42.12)

This invention relates to fishing lures, and more particularly to a fishing lure of the type wherein motion of the lure through the water produces movement of a part of the lure itself with respect to the main body thereof, thereby producing a realistic effect.

A main object of the invention is to provide a novel and improved fishing lure which is simple in construction, attractive in appearance and durably built.

A further object of the invention is to provide an improved fishing lure having a portion thereof motivated by the passage of the lure through the water, said lure being inexpensive to manufacture, sturdy in construction and realistic in appearance.

Further objects and advantages of the invention will become apparent from the following description and claims, and from the accompanying drawings, wherein:

Figure 1 is a side elevational view of a fishing lure constructed in accordance with the present invention.

Figure 2 is a top plan view, partly broken away, of the fishing lure of Figure 1.

Figure 3 is a longitudinal cross-sectional view taken on line 3—3 of Figure 2.

Figure 4 is a detail perspective view of a hook bracket member employed in the fishing lure of Figure 1.

Figure 5 is a detail plan view of a modified tail member which may be employed in the fishing lure of the present invention.

Figure 6 is a cross-sectional detail view of a modified rotor member which may be employed in the fishing lure of the present invention.

Referring to the drawings, 11 designates the main body portion of the fishing lure, said main body portion being generally channel-shaped and of substantially U-form in cross section and made of suitable rigid material such as metal or plastic, and comprising a pair of vertical parallel wall members 12, 12 integrally connected at their bottom edges by curved corner bends to a horizontal bottom wall member 13 extending longitudinally from the rear ends of said vertical wall members to substantially the mid portions thereof at their bottom edges, said horizontal wall member 13 terminating at its forward end in a downwardly curved lip 14. The forward end portions of the bottom edges of said vertical wall members are integrally connected by a transverse apertured plate 15 at the aperture 16 of which the fishing line is adapted to be connected.

The top edges of the vertical walls 12, 12 are arcuately curved and are connected at their forward portions by a transverse top wall member 17 having an inwardly curved forward end portion 18 defining with plate 15 a water inlet passage or flow opening 19. Lip 14 is also spaced from plate 15 to define a second water inlet passage or flow opening 20 at the bottom of the lure body 11.

Journaled transversely in the vertical wall members 12, 12 subadjacent to top wall 17 is a rotor 21 formed with four equally spaced radial vanes 22 having curved end portions 23, said vanes and rotor being completely housed between the side walls and being rotated by the flow of water through the passages 19 and 20 when the lure is drawn through the water.

Secured to each end of the rotor shaft adjacent the outer wall surface of each vertical wall 12 is a disc member 24 having painted or otherwise marked eccentrically thereon a fish eye 25. Fish eye 25 revolves eccentrically responsive to the rotation of rotor 21, as above described, producing a realistic effect as the lure is drawn through the water.

The rotor may have only three vanes 22 instead of four vanes, as shown in Figure 6, or any other desired number of vanes.

Secured to horizontal wall member 13 by a machine screw 26 is a bracket plate or clamp 28 which overlies a rearwardly extending tail member 27 of suitable material such as flexible rubber or plastic material, the screw 26 also passing through the forward end portion of the tail member. The tail member 27 shown in Figures 1, 2 and 3, has three divergent fins 29 at its rear end, but may have only two such fins, or may be formed with a plurality of parallel fins, as shown at 30 in the alternative embodiment illustrated in Figure 5, wherein 31 designates an alternative tail member which may be employed in place of tail member 27.

Secured under the head of screw 26 is the eye loop 32 of a rearwardly extending hook 33, the rear aperture 34 of bracket plate or clamp 28 being sufficiently large to receive said eye loop so that it will lie flush with the surface of the bracket plate, and the bracket plate being formed with a downwardly concave longitudinal channel 35 adapted to overlie the shank of the hook. Secured under the head of screw 26 is the looped end of a rearwardly and upwardly inclined resilient wire guard member 36 having a looped rear end 37 normally positioned forwardly adjacent the hook barb to prevent the hook from being fouled by weeds and the like as it is drawn through the water.

While certain specific embodiments of a fishing lure device have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A fishing lure comprising a body member of substantially U-form in cross section having vertical parallel longitudinal walls and a bottom wall having a flow opening, a vaned rotor journaled transversely in said walls and having a shaft extending through said walls, a disc member secured to each end of said shaft exteriorly of said side walls and marked eccentrically with a fish eye, a rearwardly extending tail secured to said body member, and a rearwardly extending hook secured to said body member adjacent said tail.

2. A fishing lure comprising a body member of substantially U-form in cross section having vertical parallel longitudinal walls and a bottom wall having a flow opening, said walls being arcuately curved at their top edges, a vaned rotor journaled transversely in said walls and having a shaft extending through said walls, disc members secured to the ends of the shaft exteriorly of said side walls, the underside of the body member being formed with an opening at its forward portion, a rearwardly extending, multiple-finned tail secured to said body member between said walls and a rearwardly extending hook secured to said body member adjacent said tail.

3. A fishing lure comprising a body member of substantially U-form in cross section having its longitudinal walls formed with arcuate top edges and a bottom wall having a flow opening, a vaned rotor journaled transversely in said walls and having a shaft extending through said walls, disc members secured to the ends of said shaft exteriorly of said side walls, each disc member being eccentrically marked with a fish eye, the underside of the body being formed with a water inlet passage at its forward portion, a rearwardly extending tail of flexible material secured to said body member, said tail having rearwardly flaring fin elements, and a rearwardly extending hook secured to said body member adjacent said tail.

4. A fishing lure comprising a body member of substantially U-form in cross section having a bottom wall having a flow opening and longitudinal walls formed with arcuate top edges, a vaned rotor journaled transversely in said longitudinal walls and having a shaft extending through said longitudinal walls, disc members secured to the ends of said shaft, each disc member being eccentrically marked, a transverse top wall secured to the longitudinal walls adjacent the forward end of the body member and defining a water inlet or flow opening passage with respect to the bottom wall of said body member, said bottom wall being formed at its forward portion with a second water inlet passage or flow opening, a rearwardly extending multiple-finned tail secured to said bottom wall, a rearwardly extending hook secured to said bottom wall adjacent said tail, and a resilient wire guard secured to said bottom wall and extending adjacent the hook barb.

5. A fishing lure comprising a body member substantially U-shaped in cross section and having vertical side walls and a bottom wall provided with a flow opening, a shaft journalled in the side walls, a disc member secured to each of the ends of said shaft exteriorly of the side walls and marked eccentrically with a fish eye, a rearwardly extending tail secured to the said body member, and a rearwardly extending hook secured to said body member adjacent said tail.

6. A fishing lure comprising a body member substantially U-shaped in cross section and having vertical side walls and a bottom wall provided with a flow opening, a shaft journalled in the side walls, a flow actuated rotor mounted on said shaft housed between the side walls, a disc member secured to each of the ends of said shaft exteriorly of the side walls and marked eccentrically with a fish eye, a rearwardly extending tail secured to said body member, and a rearwardly extending hook secured to said body member adjacent said tail.

7. A fishing lure comprising a body member substantially U-shaped in cross section and having vertical side walls and a bottom wall provided with a flow opening, a transverse top wall disposed between the side walls and defining a flow opening, a shaft journalled in the side walls, a rotor on said shaft housed between the side walls in position to be rotated by flow through said flow openings, a disc member secured to each of the ends of said shaft exteriorly of the side walls and marked eccentrically with a fish eye, a rearwardly extending tail secured to said body member, and a rearwardly extending hook secured to said body member adjacent said tail.

8. A fishing lure comprising a body member substantially U-shaped in cross section and having vertical side walls and a bottom wall provided with a flow opening, a transverse top wall disposed between the side walls and defining a flow opening, a shaft journalled in the side walls, a rotor on said shaft housed between the side walls in position to be rotated by flow through said flow openings, a disc member secured to each of the ends of said shaft exteriorly of the side walls and marked eccentrically with a fish eye, a clamping member secured to the rear of said bottom wall, a rearwardly extending tail secured by said clamping member, and a rearwardly extending hook secured by said clamping member to the bottom wall adjacent said tail.

JACK M. KNEECE.

REFERENCES CITED

The following references are of record in the file of this patent:

UNITED STATES PATENTS

| Number | Name | Date |
|---|---|---|
| 641,839 | Clay | Jan. 23, 1900 |
| 1,061,965 | Daly et al. | May 13, 1913 |
| 2,341,234 | O'Byrne | Feb. 8, 1944 |
| 2,381,099 | Baldesberger | Aug. 7, 1945 |